United States Patent
Berardinelli et al.

(10) Patent No.: US 10,498,557 B2
(45) Date of Patent: Dec. 3, 2019

(54) CHANNEL ESTIMATION FOR ZT DFT-S-OFDM

(71) Applicant: Nokia Solutions and Networks Oy, Espoo (FI)

(72) Inventors: Gilberto Berardinelli, Aalborg (DK); Frank Frederiksen, Klarup (DK); Klaus Ingemann Pedersen, Aalborg (DK); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/760,270

(22) PCT Filed: Jul. 20, 2016

(86) PCT No.: PCT/EP2016/067311
§ 371 (c)(1),
(2) Date: Mar. 15, 2018

(87) PCT Pub. No.: WO2018/014949
PCT Pub. Date: Jan. 25, 2018

(65) Prior Publication Data
US 2018/0254924 A1 Sep. 6, 2018

(51) Int. Cl.
*H04L 25/02* (2006.01)
*H04L 27/26* (2006.01)

(52) U.S. Cl.
CPC .......... *H04L 25/0204* (2013.01); *H04L 25/02* (2013.01); *H04L 25/022* (2013.01); *H04L 27/265* (2013.01); *H04L 27/2647* (2013.01)

(58) Field of Classification Search
CPC ... H04L 25/0204; H04L 25/02; H04L 25/022; H04L 27/2647; H04L 27/265;
(Continued)

(56) References Cited

U.S. PATENT DOCUMENTS

| 9,544,173 | B1 | 1/2017 | Berardinelli et al. |
| 2007/0165588 | A1 | 7/2007 | McCoy ......................... 370/344 |
| 2018/0219709 | A1* | 8/2018 | Pawar ................. H04L 27/2613 |

FOREIGN PATENT DOCUMENTS

| JP | 2004266814 A | 9/2004 |
| JP | 2009524348 A | 6/2009 |
| KR | 20130047769 A | 5/2013 |

OTHER PUBLICATIONS

Berardinelli, Gilberto, et al., "Reference Sequence Desgin for Zero-Tail DFT-spread-OFDM," 2016 IEEE Wireless Conference and Networking Conference Track 1: PHY and Fundamentals, Apr. 3, 2016, 5 pgs.
(Continued)

*Primary Examiner* — Sophia Vlahos
(74) *Attorney, Agent, or Firm* — Harrington & Smith

(57) ABSTRACT

A signal modulated according to zero-tail discrete Fourier transform spread orthogonal frequency division multiplexing (ZT DFT-s-OFDM) is received over a channel. The signal is down-sampled into a first sequence including N samples, N corresponding to the number of used subcarriers. The first Nh samples and the last Nt samples are removed from the first sequence, thereby obtaining a second sequence having a length of N-Nh-Nt. The second sequence is correlated with a reference sequence which has a length N-Nh-Nt, and a frequency response of the channel is estimated over the N used subcarriers based on a result of the correlation.

14 Claims, 5 Drawing Sheets

(58) Field of Classification Search
CPC . H04L 27/26; H04L 25/0202; H04L 25/0206; H04L 25/0208; H04L 25/021; H04L 25/0212; H04L 25/0228; H04L 25/0232; H04L 25/0224; H04L 25/0226; H04L 25/023
See application file for complete search history.

(56) References Cited

OTHER PUBLICATIONS

Mogensen, Preben, et al., "Centimeter-Wave Concept for 5G Ultra-Dense Small Cells," 2014 IEEE 79$^{th}$ Vehicular Technology Conference, May 18-21, 2014, Seoul, Korea, 6 pgs.
Berardinelli, Gilberto, et al., "Zero-Tail DFT-spread-OFDM Signals," 2013 IEEE Globecom Workshops, vol. Refre, Dec. 9, 2013, 6 pgs.
Popovic, Branislav M., "Generalized Chirp-Like Polyphase Sequences with Optimum Correlation Properties," IEEE Transactions on Information Theory, vol. 38, No. 4, Jul. 1992, 4 pgs.
"Waveform Candidates", Qualcomm Incorporated, 3GPP TSG-RAN WG1 #84b, R1-162199, Apr. 2016, 26 pgs.
Qualcomm Incorporated, R1-162199, Waveform Candidates, 3GPP TSG RAN WG 1 #84bis (Apr. 4, 2016).

\* cited by examiner

CHANNEL ESTIMATION FOR ZT DFT-S-OFDM

BACKGROUND OF THE INVENTION

Field of the Invention

The present invention relates to the area of waveform design for upcoming 5th generation (5G) wireless systems. In particular, the present invention relates to channel estimation for zero-tail DFT-spread-OFDM (ZT DFT-s-OFDM) modulation.

The following meanings for the abbreviations used in this specification apply:
5G 5th Generation
BS Base Station
CP Cyclic Prefix
DFT Discrete Fourier Transform
DMRS Demodulation Reference Signal
GP Guard Period
IFFT Inverse Fast Fourier Transform
LTE Long Term Evolution
MSE Mean Square Error
OFDM Orthogonal Frequency Division Multiplexing
PAPR Peak-to-Average Power Ratio
RACH Random Access Channel
RF Rejection Factor
UE User Equipment
ZC Zadoff-Chu
ZT Zero-tail ZT DFT-s-OFDM signals have been recently proposed as an enhancement of conventional OFDM and DFT-s-OFDM waveforms, where the CP (cyclic prefix) is replaced by a low power tail. Such tail is obtained as a natural output of the Inverse Fast Fourier Transform (IFFT) rather than being appended to the generated time symbols as for the case of the CP. Differently from waveforms adopting a CP, in ZT DFT-s-OFDM the duration of the low power tail does not need to be defined in the frame numerology but can be set dynamically according to the estimated delay spread of the channel. This simplifies the system design since it decouples the radio numerology from the channel characteristics, also improving the coexistence between neighbour cells. Moreover, it allows overcoming the aforementioned inefficiencies of a hard-coded CP.

A ZT DFT-s-OFDM signal also features a short low power head. While the low power tail is intended to cope with the measured delay spread of the channel, the low power head is inserted for avoiding the power regrowth at the last samples of the tail due to the cyclicity of the IFFT operation.

Another significant advantage of ZT DFT-s-OFDM is its improved spectral containment with respect to OFDM/DFT-s-OFDM. The presence of both low power head and tail allows indeed to smoothen the transition between adjacent time symbols, with remarkable reduction of the Out-of-Band (OOB) emissions.

Being a straightforward enhancement of DFT-s-OFDM, ZT DFT-s-OFDM benefits from subcarrier-level processing and simple extension to Multiple Input Multiple Output (MIMO) antenna technology, as well as low Peak-to-Average Power Ratio (PAPR). As conventional DFT-s-OFDM, ZT DFT-s-OFDM suffers, however, from noise enhancement leading to a BLER (block error rate) penalty with respect to OFDM. Nonetheless, the performance gap tends to vanish in case of receive diversity, especially with 4 receive antennas.

One of the most promising use cases of ZT DFT-s-OFDM is PRACH wherein the GP is included in the last part of time symbols by using ZT DFT-s-OFDM technique a shown in FIG. 1. The GP allows signals transmitted by UEs located at different distances to be time aligned within a receiver window. Compared to LTE, ZT DFT-s-OFDM avoids power loss of CP because CP can be replaced with low power samples. Further, ZT DFT-s-OFDM reduces interference to data channels due to its better spectral containment.

SUMMARY OF THE INVENTION

According to an aspect of the present invention, a method for enabling efficient channel estimation in ZT DFT-s-OFDM based on the usage of reference sequences known at both transmitter and receiver is proposed.

According to an aspect of the invention, a signal modulated according to zero-tail discrete Fourier transform spread orthogonal frequency division multiplexing (ZT DFT-s-OFDM) is received over a channel. The signal is down-sampled into a first sequence comprising N samples, N corresponding to the number of used subcarriers. The first Nh samples and the last Nt samples are removed from the first sequence, thereby obtaining a second sequence having a length of N-Nh-Nt. The second sequence is correlated with a reference sequence which has a length N-Nh-Nt, and a frequency response of the channel is estimated over the N used subcarriers based on a result of the correlation.

In the following the invention will be described by way of embodiments thereof with reference to the accompanying drawings.

DESCRIPTION OF THE EMBODIMENTS

Figure 1:
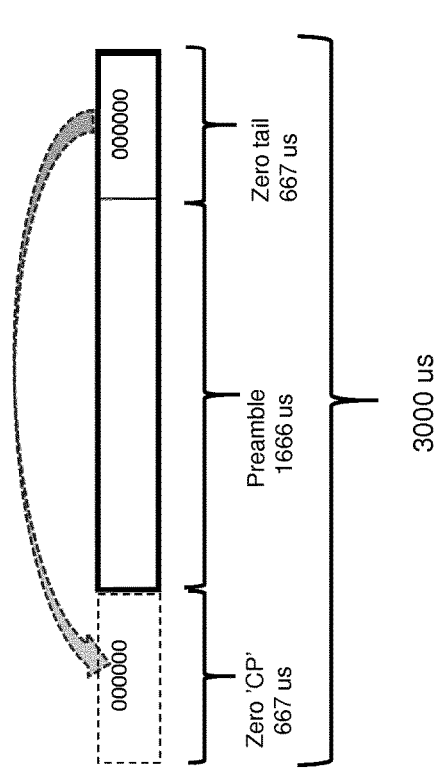
FIG. 1 shows a diagram illustrating a RACH preamble format for a cell range of 100 km.

Before explaining embodiments of the present invention, desired properties for a set of reference sequences to be used for channel estimation purposes will be described with reference to FIGS. 2 to 4.

The desired properties for a set of reference sequences to be used for channel estimation purposes are listed below:
Low autocorrelation. When correlating a sequence against itself, the correlator output should return a power peak in correspondence of a zero offset and very limited output power in case of a non-zero offset. This allows to clearly identify at the receiver the position of the channel impulse response, thus enabling its correct estimate.

Limited cross-correlation. When correlating a sequence against a different sequence belonging to the same set, the output power of the correlator should be limited. This allows to identify the response of the desired channel and thus limit the pollution due to the other reference sequences simultaneously transmitted.

Flat frequency response. The benefits of using reference sequences with a flat frequency response are twofold. First, a flat frequency response is a necessary and sufficient condition for having zero-autocorrelation in the time domain. Further, it enables a proper frequency domain equalization. A selective frequency response of the reference sequence may lead to a selective enhancement of the noise power over specific portion of the frequencies, and thus to a degraded estimate and poor equalization performance.

Low Peak-to-Average Power Ratio (PAPR). Having sequences with limited power amplitude fluctuations allows using a low input back-off at the analogue power amplifier, with benefits in terms of transmitter power efficiency.

Large cardinality. Having a large set of reference sequences featuring the same attractive properties is of paramount importance, especially in the case of dense cells deployment where devices may need to discriminate the channel response of the desired links from a large number of interfering links. The usage of MIMO technologies with a large number of antennas further exacerbates the necessity of a large set of reference sequences, e.g. for Massive MIMO applications.

Zadoff-Chu (ZC) sequences are a family of complex sequences fulfilling all the above-mentioned properties. They feature zero autocorrelation and constant cross-correlation limited to $\sqrt{L}$, where L is the length of the sequence. Further, ZC sequences have constant amplitude over both time and frequency domain. In case the length L of the ZC sequence is a prime number, the set of sequences fulfilling the mentioned properties has cardinality equal to L−1.

As a consequence of the zero autocorrelation property, the same sequence can be used simultaneously by multiple transmitters operating over the same frequency, provided a different cyclic shift of the sequence is used by each transmitter. The cyclic shift should be larger than the delay spread of the channel. A single correlator can be used at the receiver to retrieve the channel state information of several transmitters adopting different cyclic shifts of the same base sequence.

Figure 2:
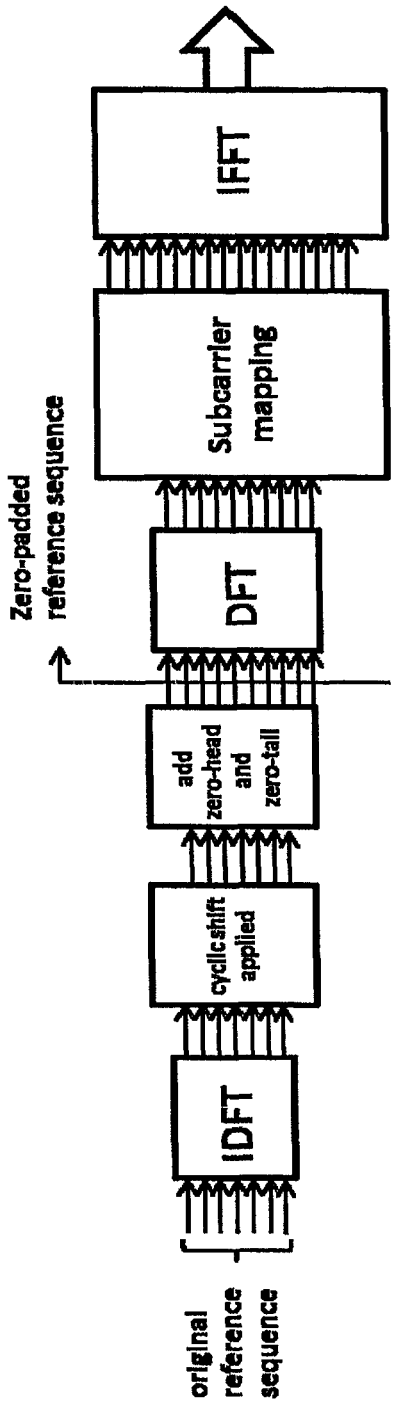
FIG. 2 shows a schematic block diagram illustrating a ZT DFT-s-OFDM transmitter chain for a reference sequence.

FIG. 2 illustrates a transmitter chain for a reference sequence when ZT DFT-s-OFDM is used. The original sequence having length N0 is typically generated in the frequency domain, and converted to time domain by an IDFT having size N0. In case ZC sequences are used, a transmitter-specific cyclic shift can then be applied. A zero-head and a zero-tail having length Nh and Nt, respectively, are added at the head and tail of the sequence, leading to a zero-padded reference sequence having a length of N=N0+Nt+Nh samples. The sequence is then converted again to the frequency domain by a DFT with size N, before undergoing subcarrier mapping and IFFT.

Figure 3:
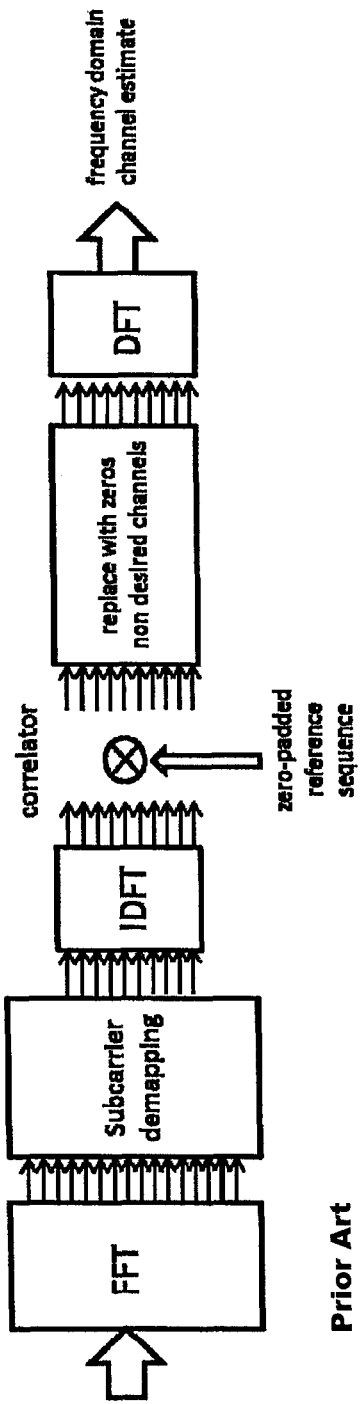
FIG. 3 shows a schematic block diagram illustrating a ZT DFT-s-OFDM channel estimator.
Figure 4:
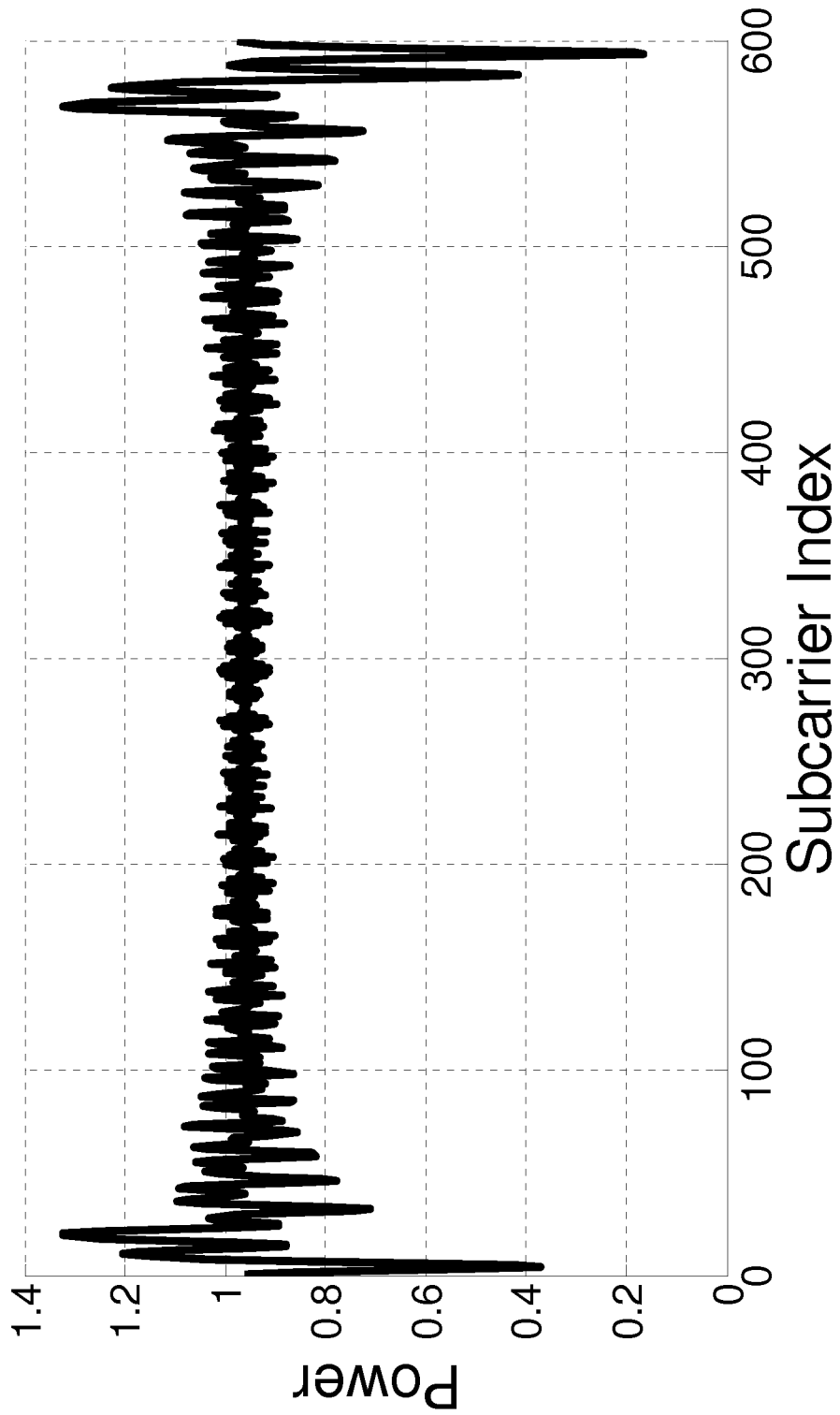
FIG. 4 shows a diagram illustrating frequency response of a ZT DFT-s-OFDM reference sequence generated with a conventional ZT DFT-s-OFDM transmitter chain, in which the non-flat frequency response is due to the pre-DFT zero-padding operation, which affects the property of the original reference sequence.

The conventional receiver structure for channel estimation, as directly translated from DFT-s-OFDM, is shown in FIG. 3. The received signal undergoes FFT, subcarrier de-mapping and IDFT, as in conventional DFT-s-OFDM processing. The sequence is then correlated against a copy of the zero-padded reference sequence. In the correlator output, only the samples collecting useful energy are collected, and the rest of the samples are replaced by zeros. The obtained estimate is then converted to frequency domain by DFT.

This receiver structure exploits the zero-padded reference sequence for extrapolating the channel estimate. However, the zero-padded sequence may not benefit of the same properties of the original sequence.

For example, in case the original reference sequence is a ZC sequence, the operation of zero-padding compromises the property of flat frequency response. The frequency response of a zero-padded ZC sequence is shown in FIG. 4. As a consequence of such frequency selective response, the noise in certain frequency subcarriers can be emphasized, and the autocorrelation properties are also negatively affected. This reduces significantly the quality of the channel estimate.

Moreover, since the eventual cyclic shift needs to be applied before zero-padding, sequences obtained with different cyclic shifts of the same base sequence translate to sequences that are not cyclic anymore. For instance, given the shift values D1 and D2, with D1 different from D2, the sequences prior zero-insertion are cyclic, but the same does not hold for the zero-padded sequences. It is therefore not possible to correctly retrieve multiple channel responses with a unique correlator as done, for instance, in LTE uplink with conventional DFT-s-OFDM. The receive signal should be correlated against the sequence obtained from the specific cyclic shift applied at the transmitter.

At least one embodiment of the present invention discloses a channel estimator for ZT DFT-s-OFDM which allows to exploit the properties of the original reference sequences rather than their zero-padded version. The channel estimator relies on the observation that, though the zero-insertion operation affects negatively the properties of the reference sequences, such properties still hold in case the zero-samples are removed from the sequence at the receiver. According to an embodiment of the present invention, correlation is performed against the original, i.e. non-zero-padded, reference sequence rather than the zero-padded sequence. The structure of the channel estimator is shown in FIG. 5, and will be described in the following.

It is to be noted that the family of reference sequences is not limited to ZC sequences, and the invention can be generalized to other families of reference sequences, e.g. m-sequences.

Figure 5:
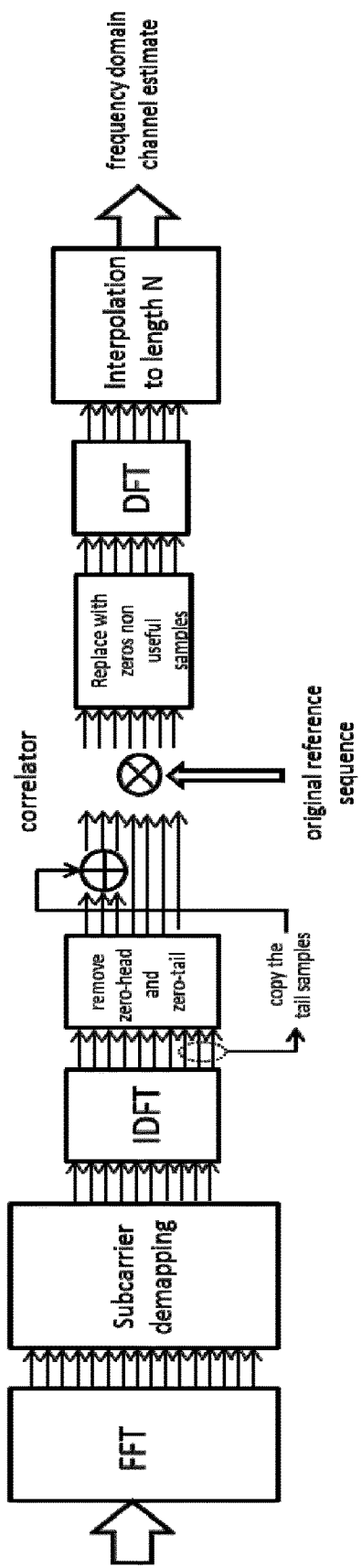
FIG. 5 shows a schematic block diagram illustrating a channel estimator according to an embodiment of the invention.

The baseband channel estimator depicted in FIG. 5, which may be implemented in a receiver, e.g. a base station, access node or eNodeB of a network providing wireless access to a communication system, receives a ZT DFT-s-OFDM signal over a channel, for example an RACH.

The received signal is down-sampled into a first sequence comprising N samples, N corresponding to the number of used subcarriers. In other words, the received signal is first converted to frequency domain by FFT. Then, non-used subcarriers are removed, i.e. subcarrier de-mapping is performed. The obtained sequence comprising N samples is then IDFT processed, with an N-size IDFT. The obtained sequence at this stage (first sequence) corresponds to a down-sampled version of the received signal at the FFT input. As a consequence, the last Nt samples (e.g. samples #N-Nt to #N) of the first sequence contain the energy due to the delay spread of the channel.

Figure 6:
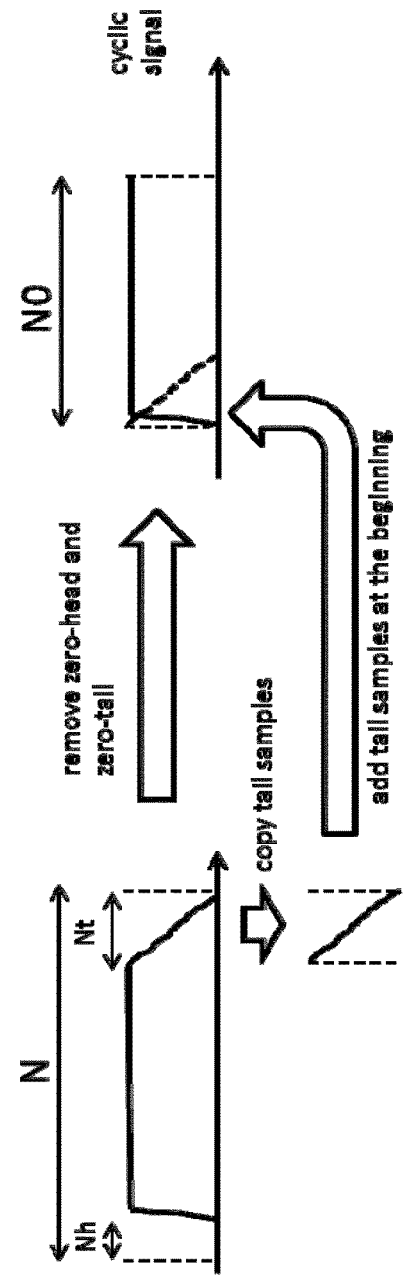
FIG. 6 shows a diagram illustrating a principle of overlap and add in block convolution.

The last Nt samples of the first sequence may be temporarily stored. The first Nh samples (e.g. samples #1 to #Nh)

and the last Nt samples are removed from the first sequence. The resulting sequence (second sequence) has a length of N-Nt-Nh. The last Nt samples which may have been temporarily stored may be added to the first Nt samples (e.g. samples #1 to #Nt) of the second sequence. This operation is meant to emulate a cyclic fading in the second sequence. This principle is known as overlap and add in block convolution and is shown in FIG. 6.

The second sequence to which the Nt samples may have been added as mentioned above is correlated, by a correlator shown in FIG. 5, against a non-zero-padded (i.e. "original") reference sequence having length N-Nt-Nh.

In the correlator output, only the samples collecting useful energy are collected, and the rest of the samples are replaced by zeros, thereby obtaining a third sequence of length N-Nt-Nh. The third sequence is converted again to frequency domain by a DFT with size N-Nt-Nh, thereby obtaining a fourth sequence of length N-Nt-Nh. An estimate of the channel frequency response over the N used subcarriers is then obtained by interpolating the frequency domain sequence, i.e. the fourth sequence, to a vector of length N.

Since the correlation is run against "original", i.e. non-zero-padded, reference sequences, their properties are preserved. Further, it becomes possible to retrieve with a unique correlator the channel responses from multiple cyclic shifted versions of the same sequence.

In an implementation example of the invention, the following setting is considered for assessing performance of the channel estimator according to embodiments of the present invention as depicted in FIG. 5:

Number of subcarriers N=600;
FFT size Nf=1024;
Pre-DFT zero-head samples (Nh): 4
Pre-DFT zero-tail samples (Nt): 42
Subcarrier spacing: 15 KHz
Channel model: Typical Urban, with excess delay of around ~2.2 µs.

The length of the over-the-air zero-tail is approximately equal to the CP duration in LTE. As a basic reference sequence, a cyclically extended ZC sequence with length N-Nt-Nh=554 is used.

The performance of embodiments of the present invention compared to earlier solutions is evaluated in terms of Mean Square Error (MSE) of the channel estimate. The following three options are studied:

Option A. The reference sequence transmitted over-the-air is generated as in FIG. 2, and the channel frequency response is estimated with the channel estimator structure shown in FIG. 3.

Option B. A distorted reference sequence transmitted over-the-air is generated as disclosed in U.S. Ser. No. 14/854,474, and the channel frequency response is estimated with the channel estimator structure shown in FIG. 3.

Option C. The reference sequence transmitted over-the-air is generated as in FIG. 2, and the channel frequency response is estimated with a channel estimator according to embodiments of the present invention as depicted in FIG. 5.

Further, the case is considered when only the desired ZC sequence is transmitted (no interferers), as well as the cases when other transmitters are using a different cyclic shift of the same ZC sequence simultaneously over the same band.

Figure 7:
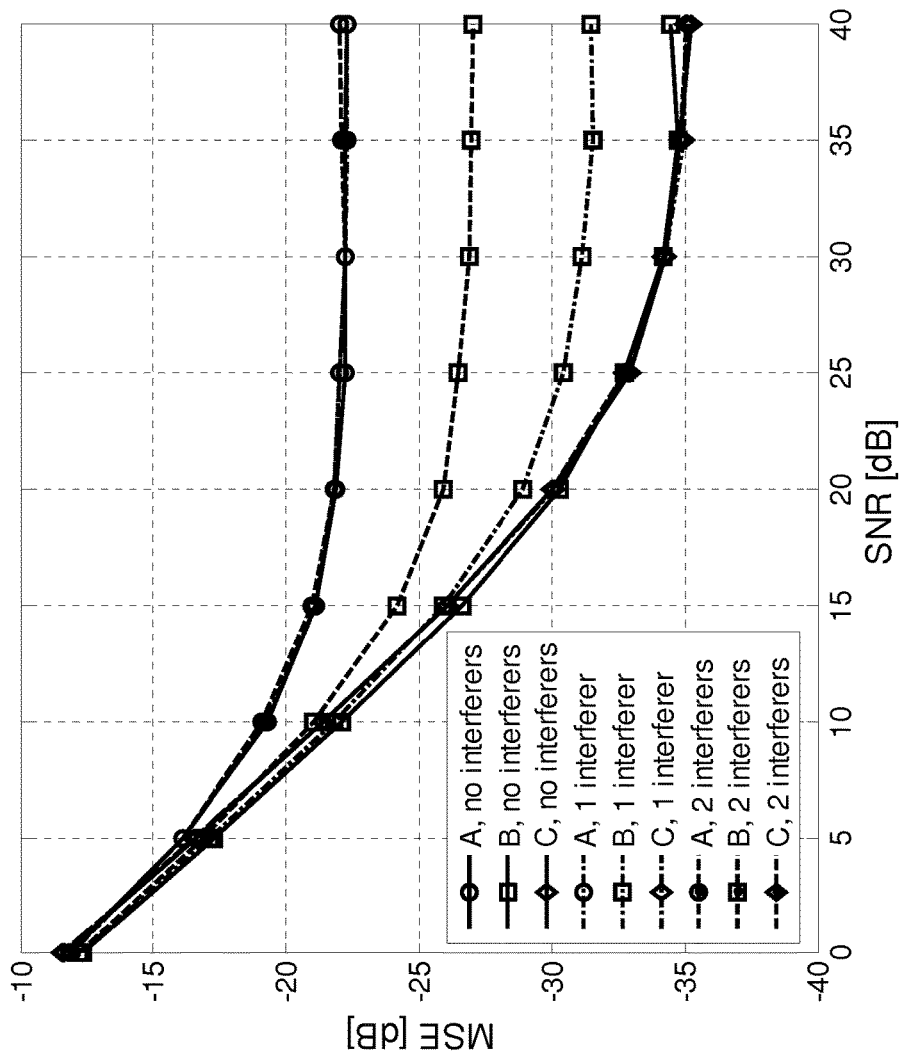
FIG. 7 shows a diagram illustrating MSE performance of different channel estimators.

Results are shown in FIG. 7. It can be observed that:

Option A suffers from the non-ideal autocorrelation and non-flat response of the zero-padded reference sequence, leading to a significant error floor.

Option B shows good performance in case no interferers are present. Performance degrades significantly in the presence of interferers. This is due to the fact that cyclic shifts of the same original ZC sequence translate to different sequences, which do not benefit from zero cross-correlation.

Option C using the channel estimator according to the embodiments of the present invention shows low MSE regardless of the presence of interferers.

The embodiments of the present invention enable efficient channel estimation without modifying a transmit signal. An embodiment of the invention allows using ZC sequences with zero tail as RACH preamble or DMRS sequences, and multiple preamble sequences can be obtained from a single ZC sequence with cyclic shift similar to LTE. In another embodiment of the invention, m-sequences are used in place of the ZC sequences.

Figure 8:
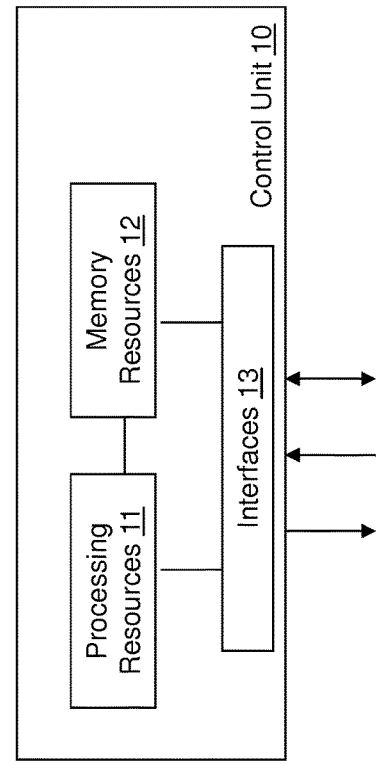
FIG. 8 shows a schematic block diagram illustrating a configuration of a control unit in which examples of embodiments of the invention are implementable.

FIG. 8 shows a schematic block diagram illustrating a configuration of a control unit 10 in which examples of embodiments of the invention are implementable.

The control unit 10, which may be part of and/or used by a receiver, e.g. a base station, access node or eNodeB of an access network providing wireless access to a communication system, comprises processing resources (processing circuitry) 11, memory resources (memory circuitry) 12 and interfaces (interface circuitry) 13. The memory resources 12 may store at least one program for causing the control unit 10, when the program is executed by the processing resources 11, to perform the operations of the channel estimator described above with reference to FIG. 5. For example, the interfaces 13 receive a ZT DFT-s-OFDM signal over a channel, e.g. over the air, the processing resources 11 process the ZT DFT-s-OFDM signal based on the program stored in the memory resources 12, and the interfaces 13 output the estimated frequency response of the channel. The memory resources 12 may also store the reference sequence to be used for correlation.

In general, the exemplary embodiments of this invention may be implemented by computer software stored in the memory resources 12 and executable by the processing resources 11, or by hardware, or by a combination of software and/or firmware and hardware.

The memory resources 12 may be of any type suitable to the local technical environment and may be implemented using any suitable data storage technology, such as semiconductor based memory devices, magnetic memory devices and systems, optical memory devices and systems, fixed memory and removable memory. The processing resources 11 may be of any type suitable to the local technical environment, and may include one or more of general purpose computers, special purpose computers, microprocessors, digital signal processors (DSPs) and processors based on a multi core processor architecture, as non-limiting examples.

Further, as used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
   receiving, over a channel, a signal modulated according to zero-tail discrete Fourier transform spread orthogonal frequency division multiplexing;
   down-sampling the signal into a first sequence comprising N samples;
   removing first Nh samples and last Nt samples from the first sequence, thereby obtaining a second sequence having a length of N-Nh-Nt;
   correlating the second sequence with a reference sequence which has a length N-Nh-Nt; and
   estimating a frequency response of the channel based on a result of the correlation.

2. The method of claim 1, comprising:
   adding the last Nt samples from the first sequence to first Nt samples of the second sequence.

3. The method of claim 1, the down-sampling comprising:
   converting the received signal into frequency domain, thereby obtaining a converted signal;
   performing subcarrier de-mapping on the converted signal, thereby obtaining a de-mapped signal comprising N samples, with N corresponding to the number of used subcarriers;
   converting the de-mapped signal into time domain, thereby obtaining the first sequence comprising N samples.

4. The method of claim 1, the estimating comprising:
   acquiring an estimate of multiple channel responses from the correlation, which are obtained from cyclic shifts of the same reference sequence;
   collecting samples that provide useful energy and replacing the rest of the samples with zeros, thereby obtaining a third sequence of length N-Nt-Nh;
   converting the third sequence into frequency domain, thereby obtaining a fourth sequence of length N-Nt-Nh; and
   interpolating the fourth sequence to a vector of length N, thereby obtaining an estimate of the frequency response over the N used subcarriers.

5. The method of claim 1, wherein the reference sequence belongs to one of the following reference sequence families: Zadoff-Chu sequences or m-sequences.

6. A computer program product embodied on a non-transitory computer-readable medium, comprising software code portions configured to, when executed on at least one processor, cause:
   receive, over a channel, a signal modulated according to zero-tail discrete Fourier transform spread orthogonal frequency division multiplexing;
   down-sample the signal into a first sequence comprising N samples;
   remove first Nh samples and last Nt samples from the first sequence, thereby obtaining a second sequence having a length of N-Nh-Nt;
   correlate the second sequence with a reference sequence which has a length N-Nh-Nt; and
   estimate a frequency response of the channel based on a result of the correlation.

7. An apparatus comprising at least one processor and at least one non-transitory memory including computer program code, the at least one non-transitory memory and the computer program code configured to, with the at least one processor, cause the apparatus at least to perform:
   receiving, over a channel, a signal modulated according to zero-tail discrete Fourier transform spread orthogonal frequency division multiplexing;
   down-sampling the signal into a first sequence comprising N samples;
   removing first Nh samples and last Nt samples from the first sequence, thereby obtaining a second sequence having a length of N-Nh-Nt;
   correlating the second sequence with a reference sequence which has a length N-Nh-Nt; and
   estimating a frequency response of the channel based on a result of the correlation.

8. The apparatus of claim 7, wherein the at least one non-transitory memory and the computer program code are configured to, with the at least one processor, cause the apparatus to further perform:
   adding the last Nt samples to first Nt samples of the second sequence.

9. The apparatus of claim 7, wherein the at least one non-transitory memory and the computer program code are configured to, with the at least one processor, cause the apparatus to perform:
   converting the received signal into frequency domain, thereby obtaining a converted signal;
   performing subcarrier de-mapping on the converted signal, thereby obtaining a de-mapped signal comprising N samples, with N corresponding to the number of used subcarriers;
   converting the de-mapped signal into time domain, thereby obtaining the first sequence comprising N samples.

10. The apparatus of claim 7, wherein the at least one non-transitory memory and the computer program code are configured to, with the at least one processor, cause the apparatus to perform:
    acquiring an estimate of multiple channel responses from the correlation, which are obtained from cyclic shifts of the same reference sequence;
    collecting samples that provide useful energy and replacing the rest of the samples with zeros, thereby obtaining a third sequence of length N-Nt-Nh;
    converting the third sequence into frequency domain, thereby obtaining a fourth sequence of length N-Nt-Nh; and interpolating the fourth sequence to a vector of length N, thereby obtaining an estimate of the frequency response over the N used subcarriers.

11. An apparatus comprising:

means for receiving, over a channel, a signal modulated according to zero-tail discrete Fourier transform spread orthogonal frequency division multiplexing;

means for down-sampling the signal into a first sequence comprising N samples;

means for removing first Nh samples and last Nt samples from the first sequence, thereby obtaining a second sequence having a length of N-Nh-Nt;

means for correlating the second sequence with a reference sequence which has a length N-Nh-Nt; and means for estimating a frequency response of the channel based on a result of the correlation.

12. The apparatus of claim 11, further comprising:

means for adding the last Nt samples to first Nt samples of the second sequence.

13. The apparatus of claim 11, wherein the means for down-sampling the signal into the first sequence comprising N samples comprises:

first means for converting the received signal into frequency domain, thereby obtaining a converted signal;

means for performing subcarrier de-mapping on the converted signal, thereby obtaining a de-mapped signal comprising N samples, with N corresponding to the number of used subcarriers; and second means for converting the de-mapped signal into time domain, thereby obtaining the first sequence comprising N samples.

14. The apparatus of claim 11, wherein the means for estimating the frequency response of the channel based on the result of the correlation comprises:

means for acquiring an estimate of multiple channel responses from the correlation, which are obtained from cyclic shifts of the same reference sequence;

means for collecting samples that provide useful energy and replacing the rest of the samples with zeros, thereby obtaining a third sequence of length N-Nt-Nh;

third means for converting the third sequence into frequency domain, thereby obtaining a fourth sequence of length N-Nt-Nh; and means for interpolating the fourth sequence to a vector of length N, thereby obtaining an estimate of the frequency response over the N used subcarriers.

* * * * *